US 8,307,366 B2

(12) United States Patent
Lipton et al.

(10) Patent No.: US 8,307,366 B2
(45) Date of Patent: Nov. 6, 2012

(54) POST-PROCESSING PHASE IN A DISTRIBUTED PROCESSING SYSTEM USING ASSIGNMENT INFORMATION

(75) Inventors: Daniel Lipton, Belmont, CA (US); Samuel L. Weiss, Bainbridge Island, WA (US)

(73) Assignee: Apple Inc., Cupertino, CA (US)

( * ) Notice: Subject to any disclaimer, the term of this patent is extended or adjusted under 35 U.S.C. 154(b) by 1488 days.

(21) Appl. No.: 11/395,998

(22) Filed: Mar. 30, 2006

(65) Prior Publication Data

US 2007/0234364 A1    Oct. 4, 2007

(51) Int. Cl.
*G06F 9/46* (2006.01)
*G06F 15/16* (2006.01)

(52) U.S. Cl. .................................... 718/102; 709/208
(58) Field of Classification Search .................. 718/101, 718/102, 106; 709/208
See application file for complete search history.

(56) References Cited

U.S. PATENT DOCUMENTS

| | | | |
|---|---|---|---|
| 5,315,701 A | 5/1994 | DiNicola et al. | |
| 5,889,989 A | 3/1999 | Robertazzi et al. | |
| 7,103,628 B2 * | 9/2006 | Neiman et al. | 709/201 |
| 7,516,360 B2 * | 4/2009 | Bacher et al. | 714/12 |
| 7,650,331 B1 * | 1/2010 | Dean et al. | 712/203 |
| 7,844,129 B2 * | 11/2010 | Namikata et al. | 382/284 |
| 2003/0237084 A1 * | 12/2003 | Neiman et al. | 718/102 |
| 2004/0066384 A1 * | 4/2004 | Ohba | 345/419 |
| 2005/0243922 A1 * | 11/2005 | Magee et al. | 375/240.12 |
| 2005/0289215 A1 * | 12/2005 | Namikata et al. | 709/200 |
| 2007/0088828 A1 * | 4/2007 | Inampudi et al. | 709/226 |

OTHER PUBLICATIONS

Yang et al., "Setup Algorithm of Web Service Composition", ICA3PP 2005, LNCS 3719, pp. 139-148, 2005.*
Popwire Technology, "Compression Engine 4.0," product info, located on the internet at <popwire.com/product_info.php-?products_id=3>, downloaded on Jun. 15, 2006, 2 pages.

* cited by examiner

*Primary Examiner* — Meng An
*Assistant Examiner* — Brian Chew
(74) *Attorney, Agent, or Firm* — Park, Vaughan, Fleming & Dowler LLP

(57) ABSTRACT

A method and apparatus for processing a computing job in a distributed processing system. A control process sends a message to an instance of an application instructing the application instance to divide the job into assignments for processing by various application instances. The application instance divides the job in a way that is suitable for the particular application and sends, to the control process, assignment information that describes how the job is to be divided. The control process stores the assignment information and assigns each of the application instances a portion of the computing job based on the assignment information. After, the application instances have completed the assignments, the control process instructs one of the application instances to perform post-processing on the assignment results, based on the assignment information.

34 Claims, 4 Drawing Sheets

# POST-PROCESSING PHASE IN A DISTRIBUTED PROCESSING SYSTEM USING ASSIGNMENT INFORMATION

FIELD OF THE INVENTION

The present invention relates to distributed processing. In particular, embodiments of the present invention relate to a post-processing phase in a distributed computing system.

BACKGROUND

A distributed computing system divides the work required by a computing job into different assignments, which are executed on two or more processors that share the computing job. Computing jobs are often initiated by users. There is virtually no limit to the types of computing jobs that users may initiate.

Some computing jobs that are initiated by users identify a data file that is to be processed by a specific software application. For example, a user may initiate a computing job by submitting a data file for processing by a video special effects application. As another example, the user might initiate a computing job by submitting a data file to be processed by a weather prediction application.

In each of these examples, the computing job is divided between two or more processors. More particularly, separate instances of the video special effects application execute on each of the processors to share the video special effects job. Similarly, separate instances of the weather prediction application execute on each of the processors to share the weather prediction job.

Typically, a distributed computing system has a master node that assigns different portions of the overall job to the processors. Techniques exist for the computing job to be pre-divided, prior to submission to the distributed computing system. For example, a user can manually divide a video processing job into different data segments. The user can submit the different data segments to the distributed computing system as a batch of work. Upon receiving the batch of work, the master node assigns the different data segments to different processors for parallel processing. However, in general, the master node does not understand the relationship between the data segments in the batch. Therefore, while the data segments execute faster due to parallel processing, at the end of processing the user needs to manually process the individual results produced by each of the processors.

Different jobs may need to be divided in different ways. In many cases, the way in which a computing job should be divided may be dependent upon the application that is to perform the job. For example, a computing job for an application that calculates weather might be divided in a very different way than a computing job for an application that processes video data.

Unfortunately, a master node may not know an appropriate way to divide a video file into data segments for processing the different data segments on different processors. Moreover, rather than assigning different data segments to different processors, it may be more appropriate to divide the computing job into different processing tasks for each processor. For example, processing a data file can involve tasks that can be performed independent of one another. Those tasks can be assigned to different processors. However, the master node may not know how to divide the job into different processing tasks.

A master node or the like may be programmed with the knowledge of how to divide a job associated with a particular application into different assignments. However, it could be difficult to program the master node with the knowledge to divide jobs for many different types of applications. Furthermore, if a new application is to be processed in the distributed processing system, then the master node would not know the criteria for dividing computing jobs to be processed by the new application on the distributed nodes.

Therefore, a need exists for processing a computing job in a distributed processing system, wherein the job might be processed by one of many different types of applications.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
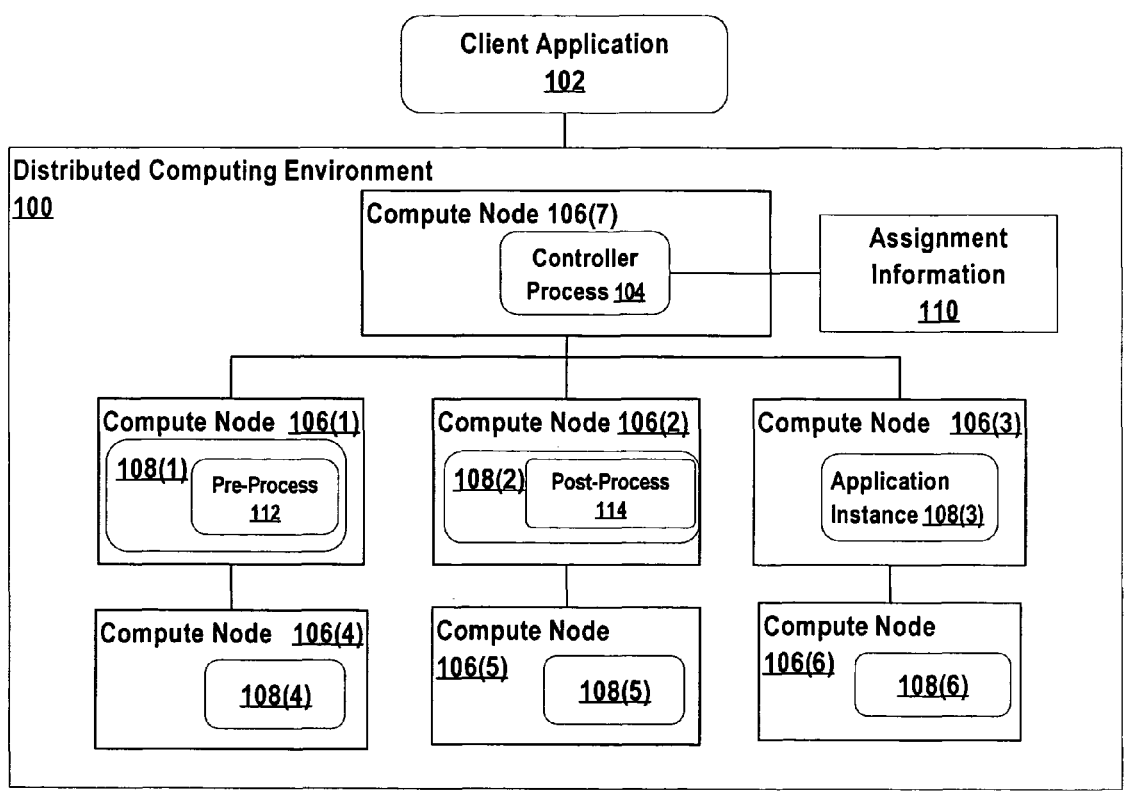
FIG. 1 is a diagram illustrating a distributed computing environment for executing a computing job with generic post-processing, in accordance with an embodiment of the present invention.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

A method and apparatus for processing a computing job in a distributed processing system are disclosed herein. The distributed computing environment has a control process executing therein, which oversees execution of the job on various processing nodes. The processing nodes have executing thereon different instances of an application for processing the job. A client submits a computing job that is to be processed by the application. For example, the client submits a job to perform video special effects on the video data in a data file. The job is routed to the control process, which sends a message to one of the application instances instructing the application instance to divide the job into assignments for processing by the various application instances.

The application instance divides the job in a way that is suitable for the particular application and sends, to the control process, assignment information that describes how the job is to be divided. The assignments may be based on data segments or processing tasks. For example, data associated with the job can be divided into data segments, wherein each data segment is processed by one application instance. As a specific example, the frames of a video rendering job could be divided into groups (e.g., data segments). Each data segment would be processed in parallel. Each application instance may perform the same type of processing on its data segment as the other application instances perform on their respective data segments. However, application instances may perform different types of processing on their respective data segments. As a specific example, a video rendering job could be subdivided into different stages of the rendering process, wherein different application instances handle the different stages.

The control process stores the assignment information and assigns each of the application instances a portion of the computing job based on the assignment information. When the application instances have each completed their respective assignments, the application instances send to the control process an indication that the assignment is completed, and notify the control process where the results produced by performing the assignment (the "assignment results") are located.

The control process then instructs one of the application instances to perform post-processing on the assignment results, based on the assignment information. The post-processing may be to merge assignment results. For example, if each application instance processed one data segment of the video file, then the post-processing that is performed merges the processed data segments. However, merging processed segments is merely one example of a post-processing operation. The actual post-processing that must be performed may vary based on the nature of the computing job involved. The techniques described herein are not limited to any particular type of post-processing operation.

Distributed Processing Environment Overview

FIG. 1 is a diagram illustrating a distributed computing environment for executing a computing job that involves (1) distributed execution of a portion of the job to produce assignment results, and (2) post-processing on assignment results, in accordance with an embodiment of the present invention. The environment 100 comprises a number of compute nodes 106, which represent computational resources such as one or more processors and computer readable memory. The compute nodes 106 may be in the form of computers (e.g. work stations, personal computers) interconnected via a network. Alternatively, the compute nodes 106 may be server blades interconnected with other server blades on a rack.

One of the compute nodes 106(7) has executing thereon a controller process 104, which controls execution of the job on the other compute nodes 106(1)-106(6). The compute node 106(7) with the controller process 104 is referred to herein as a master node. Compute nodes 106(1)-106(6) each have an instance of an application executing thereon. Each application instance processes a portion of the computing job. A compute node with an application instance executing thereon is referred to herein as a service node. A compute node can have multiple service nodes by having multiple application instances executing on the compute node. Although the controller process 104 is depicted as executing on its own compute node 106(7), the controller process 104 may execute on the same compute node 106 as one of the application instances 108. Thus, the master node may also be a service node.

The client application 102 submits a computing job request to the distributed computing environment 100. For example, the job might be a request that a video special effects application process video data provided in or referenced by the request. As another example, the job might be a request that a weather forecasting application process data that is provided in or specified by the request.

The client's job request is routed to the controller process 104. The controller process 104 manages the distribution of assignments to compute nodes. The controller process 104 determines the most efficient use of distributed computing environment resources (e.g., compute nodes 106) based on the current activity of each compute node 106 and the characteristics of the assignments. The controller process 104 does not need to understand how to break the job into assignments. Rather, breaking the job into assignments is handled by one of the application instances 108, which returns a description of the job assignments to the controller process 104. The controller process 104 stores the assignment information 110. The assignment information 110 is implemented as XML code, in one embodiment of the present invention.

Because the application, and not the controller process 104, is responsible for breaking the job up into assignments, the controller process 104 is able to manage job execution for a wide variety of applications without having to include application-specific logic for breaking up jobs. Conversely, because the controller process 104 coordinates the execution of the assignments, the applications themselves do not have to incorporate job coordination logic.

As previously mentioned, application instances 108 execute on at least some of the compute nodes 106, wherein each application instance is able to process its assigned portion of the job. At least one of the application instances 108 (e.g., application instances 108(1)) has a pre-process module 112, which comprises instructions that are able to pre-process the job at that compute node 106(1) prior to the job being processed by each of the application instances 108 at their respective compute nodes 106. The pre-process module 112 divides the job into assignments to create assignment information, in accordance with one embodiment of the present invention. The pre-process module 112 may perform other pre-processing of the job. For example if the application that executes on the compute nodes 106 is an MPEG-2 Encoder, the pre-processing might be the first pass of a two pass encoding.

Process Flow

Figure 2:
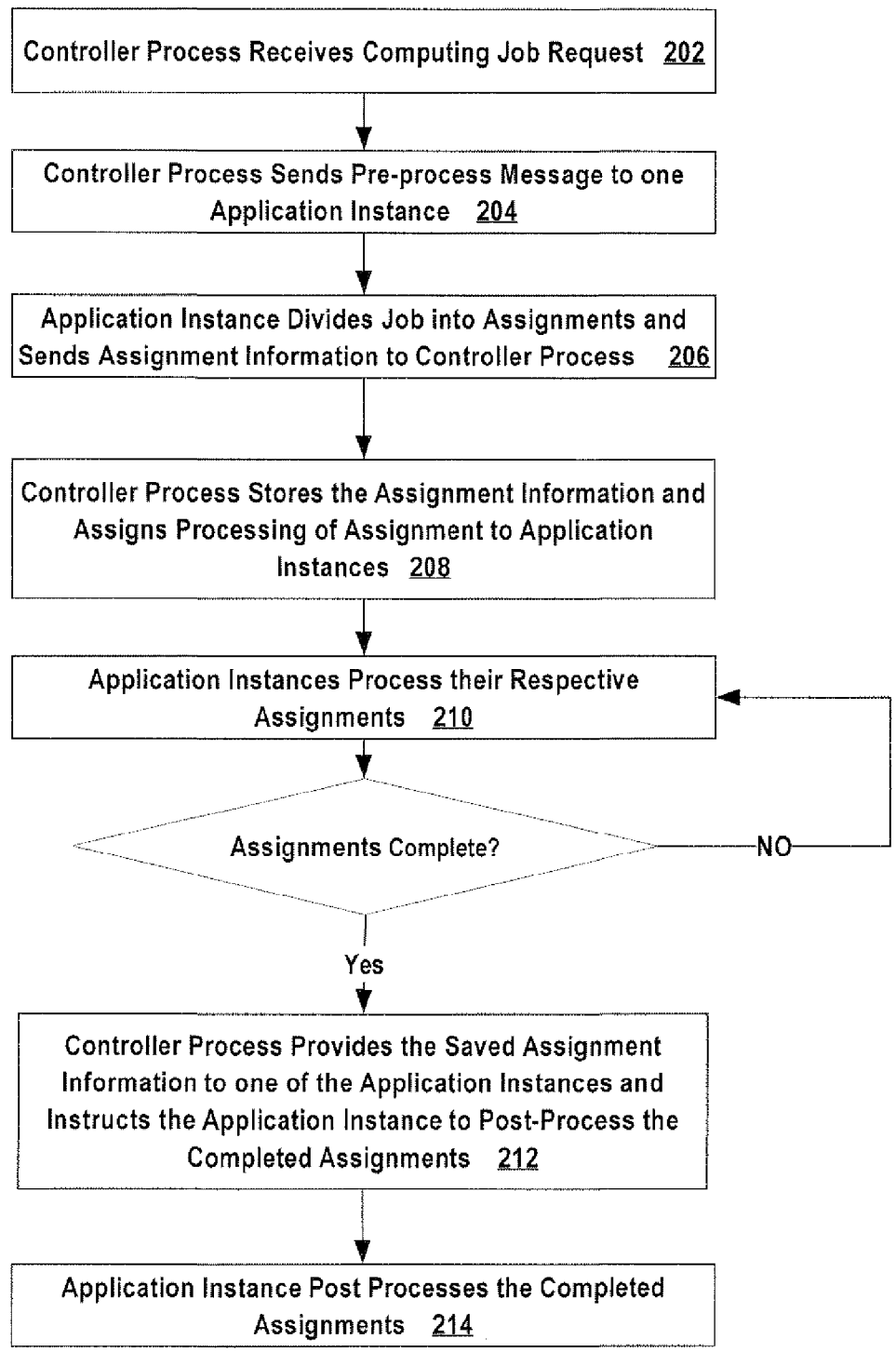
FIG. 2 is a flowchart illustrating steps of process for generic post-processing of a job in a distributed processing environment, in accordance with an embodiment of the present invention.
Figure 3:
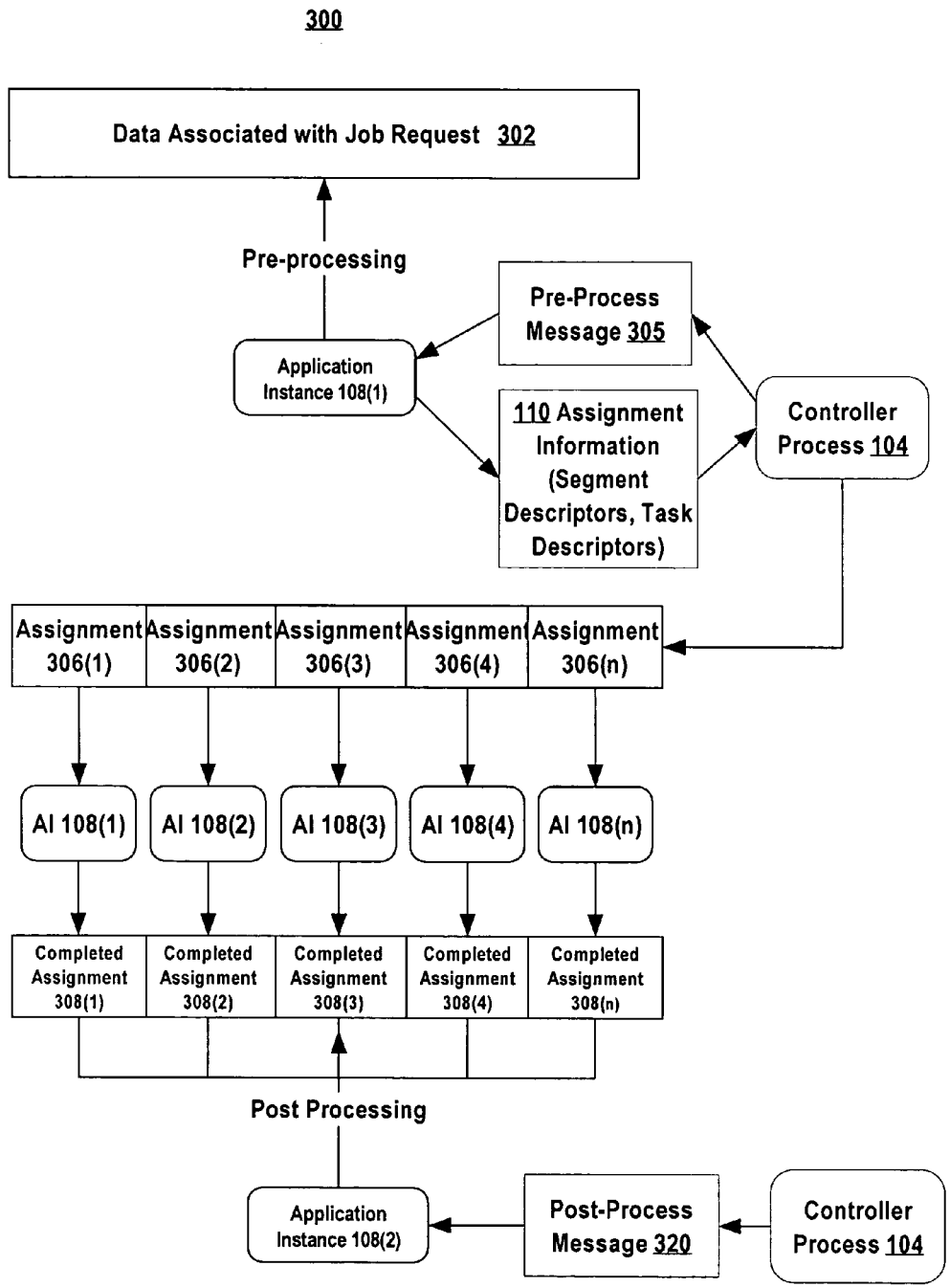
FIG. 3 is a diagram which shows message flow and data processing in accordance with an embodiment of the present invention.

FIG. 2 is a flowchart illustrating steps of process 200 for generic post-processing of a job in a distributed processing environment, in accordance with an embodiment of the present invention. Process 200 will be discussed with respect to the diagram 300 of FIG. 3, which shows message flow and data processing in accordance with an embodiment of the present invention. Step 202 of process 200 is receiving a request to perform processing on a job. For example, a user may wish to process a file containing video data with a video special effects application. Referring to FIG. 3, the job request specifies data 302 to be processed.

In step 204 of process 200, the controller process 104 sends a pre-process message 305 to one of the application instances 108(1), requesting that the application instance 108(1) divide the job into assignments that can be executed by different application instances. Prior to sending the pre-process message 305, the controller process 104 may analyze the resources available in the distributed computing environment to determine into how many assignments the job should be divided. However, as previously discussed, the controller process 104 does not need to understand how to divide the job into assignments. The controller process 104 can indicate a maximum number of assignments, a minimum number of assignments, a recommended number of assignments, a required number of assignments, etc. The controller process 104 may send a file for the application instance to fill in assignment information. For example, the controller process 104 may send to the application instance 108(1) an XML document that the application instance 108(1) can use as a template to provide the controller process 104 with assignments descriptors.

In step 206, the application instance 108(1) divides the job into assignments and sends assignment information 110 to the controller process 104. For example, the application instance 108(1) may add assignment descriptors to the XML document provided by the controller process 104. As previously discussed, the assignments may be based on data segments, processing tasks, or a combination thereof. For example, the application instance 108(1) may generate data segment descriptors and provide the segment descriptors in the assignment information 110. The segment descriptors describe how the data is to be segmented for processing by the individual application instances 108. The application instance 108(1) may also generate task descriptors, which describe the specific processing task or tasks that are to be performed for each assignment.

Thus, each assignment in the assignment information 110 may include a segment descriptor and a task descriptor. Each assignment may relate to a different data segment. However, in some cases, two assignments may involve the same data segment. In some cases, the task will be the same for all assignments. In this case, the application instance 108(1) does not need to provide the task descriptor in the assignment information 110.

The application instance 108(1) may also perform pre-processing of the data 302 associated with the job request. For example, if the data 302 is encrypted, the application instance 108(1) might decrypt the data 302 in this pre-processing stage.

In step 208, the controller process 104 stores the assignment information 110 that was received from the application instance 108(1) and assigns an assignment 306(1)-306(n) to one or more of the application instances 108(1)-108(n), based on the assignment information 110. For example, the controller process 104 extracts assignments 306 from the assignment information 110 and determines how many assignments there are. The controller process 104 sends separate messages to selected ones of the application instances 108(1)-108(n), instructing the selected application instances to each process one assignment 306. However, it is possible that more than one assignment is sent to a single application instance. In this case, the application instance can process the assignments sequentially. Each assignment 306 may contain a description of a data segment and a description of one or more processing tasks to be performed on the data segment.

In step 210, each application instance 108 processes its assignment. As previously discussed, each application instance 108 may process a different data segment. However, in some cases two or more application instances may process the same data segment 306. The application instances 108 may process the data in parallel. However, processing may be serial. For example, the processing of one application instance 108 may depend, at least in part, on the results generated by another application instance 108.

The controller process 104 monitors the assignment execution, waiting for the application instances 308 to complete their respective assignments. When the assignments are complete, control passes to step 212. In step 212, the controller process 104 provides the saved assignment information 110 to one of the application instances 108(2) and instructs the application instance 108(2) to post-process the assignment results. For example, the controller process 104 passes the XML document, which was originally filled in by application instance 108(1) with assignment descriptors, to application instance 108(2), along with a post process message. The application instance that performs post processing may be the same or a different application instance that performed pre-processing.

In step 214, the application instance 108(2) performs post-processing on the assignment results 308(1)-308(n). The post processing may include merging the assignment results 308(1)-308(n). However, the post-processing can include other operations. For example, for a weather simulator application, the post-processing may be to take the assignment results of processing raw weather data, perhaps divided along hemispheres, and post process the assignment results to form a single report of the weather forecast. Such post-processing is not merely a merging of the assignment results, but may constitute a production of a final report using the assignment results of processing each segment. Another example of post-processing is a database search. For example, if the computing job is a query to search a database, the different assignments may be for each application instance 108 to search different sections of the database. In this database search example, the post-processing may be to take the individual search results and identify one or more search results that satisfy the database query.

Hardware Overview

Figure 4:
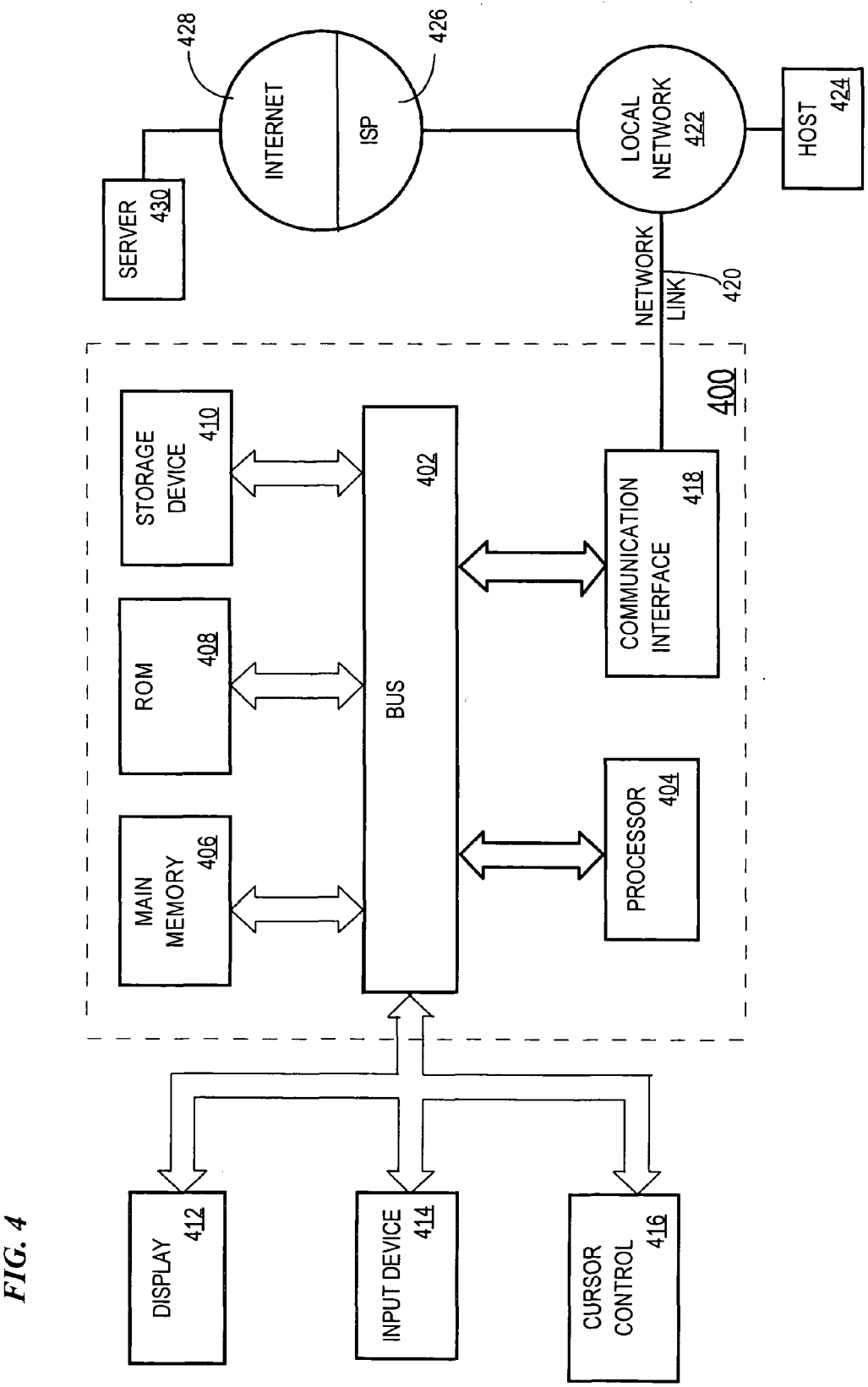
FIG. 4 is a block diagram that illustrates a computer system upon which an embodiment of the invention may be implemented.

FIG. 4 is a block diagram that illustrates a computer system 400 upon which an embodiment of the invention may be implemented. The steps in process 200 of FIG. 2 may be carried out by instructions that are executed on one or more processors. The computer system 400 of FIG. 4 provides a platform upon which to execute these instructions. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 400, various machine-readable media are involved, for example, in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A non-transitory computer storage having instructions stored therein which, when executed by one or more processors, cause the one or more processors to perform:

receiving at a controller process a computing job for processing by an application that is separate from the controller process;

after receiving the computing job, the controller process instructing a first application instance, of a plurality of instances of the application that execute in a distributed computing environment, to divide the computing job;

receiving at the controller process, from the first application instance, assignment information describing how the computing job is divided into a plurality of assignments;

the controller process assigning, based on the assignment information, the plurality of assignments to at least a subset of the plurality of application instances for processing, wherein each application instance in the subset is assigned one or more of the assignments;

the controller process determining that the subset of application instances have completed processing of the assignments to produce a plurality of assignment results; and the controller process instructing a second application instance of the plurality of application instances to perform post-processing on the assignment results, wherein instructing the second application instance to perform post-processing on the assignment results comprises providing the assignment information received from the first application instance to the second application instance to enable the second application instance to perform post-processing on the assignment results based on the assignment information;

wherein the first application instance and the second application instance are different instances of the application.

2. The non-transitory computer storage of claim 1, wherein at least one of the assignments has an associated processing task that is to be performed when that assignment is processed by an application instance.

3. The non-transitory computer storage of claim 2, wherein the controller process assigning the plurality of assignments comprises:

the controller process assigning a first assignment to a particular application instance, the first assignment having a first processing task associated therewith that is to be performed when the first assignment is processed by the particular application instance; and the controller process assigning a second assignment to another application instance, the second assignment having a second processing task associated therewith that is to be performed when the second assignment is processed by the other application instance, wherein the second processing task is different from the first processing task.

4. The non-transitory computer storage of claim 3, wherein the first assignment has a first data segment associated therewith that is to be processed when the first assignment is processed by the particular application instance, and wherein the second assignment has the same first data segment associated therewith that is to be processed when the second assignment is processed by the other application instance.

5. The non-transitory computer storage of claim 1, wherein at least one of the assignments has an associated data segment that is to be processed when that assignment is processed by an application instance.

6. The non-transitory computer storage of claim 5, wherein the controller process assigning the plurality of assignments comprises:

the controller process assigning a first assignment to a particular application instance, the first assignment having a first data segment associated therewith that is to be processed when the first assignment is processed by the particular application instance; and the controller process assigning a second assignment to another application instance, the second assignment having a second data segment associated therewith that is to be processed when the second assignment is processed by the other application instance, wherein the second data segment is different from the first data segment.

7. The non-transitory computer storage of claim 5, wherein the controller process instructing a second application instance to perform post-processing on the assignment results comprises the controller process instructing the second application instance to merge the assignment results.

8. The non-transitory computer storage of claim 1, wherein the controller process instructing a first application instance to divide the computing job comprises the controller process indicating to the first application instance at least one of: a maximum number of assignments into which the job is to be divided; a minimum number of assignments into which the job is to be divided; a recommended number of assignments into which the job is to be divided; and a required number of assignments into which the job is to be divided.

9. The non-transitory computer storage of claim 1, having further instructions stored therein which, when executed by the one or more processors, cause the one or more processors to further perform:

receiving at the controller process a second computing job for processing by a second application that is separate from the controller process;

after receiving the second computing job, the controller process instructing a particular application instance, of a plurality of instances of the second application that execute in the distributed computing environment, to divide the second computing job;

receiving at the controller process, from the particular application instance, second assignment information describing how the second computing job is divided into a second plurality of assignments;

the controller process assigning, based on the second assignment information, the second plurality of assignments to at least a subset of the plurality of instances of the second application for processing, wherein each application instance in the subset of the plurality of instances of the second application is assigned one or more of the assignments in the second plurality of assignments;

the controller process determining that the subset of the plurality of instances of the second application has completed processing of the second plurality of assignments to produce a second plurality of assignment results; and the controller process instructing a certain application instance, of the plurality of instances of the second application, to perform post-processing on the second plurality of assignment results;

wherein the second application is different from the application.

10. The non-transitory computer storage of claim 1, wherein the controller process instructing the first application instance to divide the computing job comprises:

the controller process sending a document to the first application instance that the first application instance uses as a template to provide the assignment information to the controller process; and wherein the controller process providing the assignment information to the second application instance to enable the second application instance to perform post-processing on the assignment results based on the assignment information comprises:

the controller process providing the document to the second application instance.

11. A non-transitory computer storage having instructions stored therein which, when executed by one or more processors, cause the one or more processors to perform:

receiving at a controller process a computing job for processing in a distributed computing environment;

after receiving the computing job, the controller process instructing a first service node in the distributed computing environment to divide the computing job;

wherein the first service node is different from the controller process;

receiving at the controller process, from the first service node, assignment information describing how the computing job is divided into a plurality of assignments;

based on the assignment information, the controller process determining a set of service nodes in the distributed computing environment that should receive the assignments for processing, and assigning the assignments to the set of service nodes, wherein each service node in the set of service nodes is assigned one or more assignments;

the controller process determining that the set of service nodes has completed processing of the assignments to produce a plurality of assignment results; and in response to determining that the set of service nodes has completed processing of the assignments, the controller process instructing a second service node to perform post-processing on the assignment results, wherein instructing the second service node to perform post-processing on the assignment results comprises providing the assignment information received from the first service node to the second service node to enable the second service node to perform post-processing on the assignment results based on the assignment information;

wherein the first and second service nodes are different service nodes.

12. The non-transitory computer storage of claim 11, wherein the assignments comprise information indicating processing tasks that are to be performed by the set of service nodes when processing the assignments.

13. The non-transitory computer storage of claim 12, wherein the controller process assigning the assignments to the set of service nodes comprises:

the controller process assigning a first assignment to a particular service node in the set of service nodes, the first assignment having a first processing task associated therewith that is to be performed when the first assignment is processed by the particular service node; and the controller process assigning a second assignment to another service node in the set of service nodes, the second assignment having a second processing task associated therewith that is to be performed when the second assignment is processed by the other service node, wherein the second processing task is different from the first processing task.

14. The non-transitory computer storage of claim 13, wherein the first assignment has a first data segment associated therewith that is to be processed when the first assignment is processed by the particular service node, and wherein the second assignment has the same first data segment associated therewith that is to be processed when the second assignment is processed by the other service node.

15. The non-transitory computer storage of claim 11, wherein at least one of the assignments has an associated data segment that is to be processed when that assignment is processed by a service node.

16. The non-transitory computer storage of claim 15, wherein the controller process assigning the assignments to the set of service nodes comprises:

the controller process assigning a first assignment to a particular service node in the set of service nodes, the first assignment having a first data segment associated therewith that is to be processed when the first assignment is processed by the particular service node; and the controller process assigning a second assignment to another service node in the set of service nodes, the second assignment having a second data segment associated therewith that is to be processed when the second assignment is processed by the other service node, wherein the second data segment is different from the first data segment.

17. The non-transitory computer storage of claim 15, wherein the controller process instructing a second service node to perform post-processing on the assignment results comprises the controller process instructing the second node to merge the assignment results.

18. The non-transitory computer storage of claim 11, wherein the controller process instructing a first service node to divide the computing job comprises the controller process indicating to the first service node one of: a maximum number of assignments into which the job is to be divided; a minimum number of assignments into which the job is to be divided; a recommended number of assignments into which the job is to be divided; and a required number of assignments into which the job is to be divided.

19. The non-transitory computer storage of claim 11, wherein the controller process instructing the first service node to divide the computing job comprises:

the controller process sending a document to the first service node that the first service node uses as a template to provide the assignment information to the controller process; and wherein the controller process providing the assignment information to the second service node to enable the second service node to perform post-processing on the assignment results based on the assignment information comprises:

the controller process providing the document to the second service node.

20. A system comprising:

a master node and a plurality of service nodes each of which include one or more processors;

wherein the master node is different from the service nodes and is operable to:

receive a computing job for processing;

instruct a first service node of the plurality of service nodes to divide the computing job and receive from the first service node assignment information describing how the computing job is divided into a plurality of assignments;

based on the assignment information, assign the assignments to at least a subset of two or more of the plurality of service nodes for processing, wherein each service node in the subset is assigned one or more of the assignments;

determine that the subset of service nodes has completed processing of the assignments to produce a plurality of assignment results; and instruct a second service node of the plurality of service nodes to perform post-processing on the assignment results, wherein instructing the second service node to perform post-processing on the assignment results comprises providing the assignment information received from the first service node to the second service node to enable the second service node to perform post-processing on the assignment results based on the assignment information, and wherein the first and second service nodes are different service nodes; and wherein the service nodes are operable to:

process one or more assignments assigned by the master node to generate one or more assignment results;

respond to an instruction from the master node to divide a computing job by determining how to divide the computing job into a plurality of assignments and delivering assignment information to the master node describing how the computing job is divided into a plurality of assignments; and respond to an instruction from the master node to perform post-processing by performing post-processing activity on the assignment results based on assignment information provided by the master node.

21. The system of claim 20, wherein the computing job is divided into a plurality of assignments such that each assignment has a different processing task associated therewith that is to be performed when that assignment is processed.

22. The system of claim 20, wherein the computing job is divided into a plurality of assignments such that each assignment has a different data segment associated therewith that is processed when that assignment is processed.

23. The system of claim 20, wherein performing post-processing activity on the assignment results comprises merging the assignment results.

24. The system of claim 20, wherein the master node is further operable to determine, based on the assignment information, how many service nodes to include in the subset of service nodes.

25. A machine implemented method comprising:

receiving at a controller process a computing job for processing by an application that is separate from the controller process;

after receiving the computing job, the controller process instructing a first application instance, of a plurality of instances of the application that execute in a distributed computing environment, to divide the computing job;

receiving, at the controller process, from the first application instance, assignment information describing how the computing job is divided into a plurality of assignments;

the controller process assigning, based on the assignment information, the plurality of assignments to at least a subset of the plurality of application instances for processing, wherein each application instance in the subset is assigned one or more of the assignments;

the controller process determining that the subset of application instances has completed processing of the assignments to produce a plurality of assignment results; and the controller process instructing a second application instance of the plurality of application instances to perform post-processing on the assignment results, wherein instructing the second application instance to perform post-processing on the assignment results comprises providing the assignment information received from the first application instance to the second application instance to enable the second application instance to perform post-processing on the assignment results based on the assignment information;

wherein the first application instance and the second application instance are different instances of the application;

wherein the method is performed by one or more computing devices.

26. The machine implemented method of claim 25, wherein at least one of the assignments has an associated processing task that is to be performed when that assignment is processed by an application instance.

27. The machine implemented method of claim 26, wherein the controller process assigning the plurality of assignments comprises:

the controller process assigning a first assignment to a particular application instance, the first assignment having a first processing task associated therewith that is to be performed when the first assignment is processed by the particular application instance; and the controller process assigning a second assignment to another application instance, the second assignment having a second processing task associated therewith that is to be performed when the second assignment is processed by the other application instance, wherein the second processing task is different from the first processing task.

28. The machine implemented method of claim 27, wherein the first assignment has a first data segment associated therewith that is to be processed when the first assignment is processed by the particular application instance, and wherein the second assignment has the same first data segment associated therewith that is to be processed when the second assignment is processed by the other application instance.

29. The machine implemented method of claim 25, wherein at least one of the assignments has an associated data segment that is to be processed when that assignment is processed by an application instance.

30. The machine implemented method of claim 29, wherein the controller process assigning the plurality of assignments comprises:

the controller process assigning a first assignment to a particular application instance, the first assignment having a first data segment associated therewith that is to be processed when the first assignment is processed by the particular application instance; and the controller process assigning a second assignment to another application instance, the second assignment having a second data segment associated therewith that is to be processed when the second assignment is processed by the other application instance, wherein the second data segment is different from the first data segment.

31. The machine implemented method of claim 29, wherein the controller process instructing a second application instance to perform post-processing on the assignment results comprises the controller process instructing the second application instance to merge the assignment results.

32. The machine implemented method of claim 25, wherein the controller process instructing a first application instance to divide the computing job comprises the controller process indicating to the first application instance at least one of: a maximum number of assignments into which the job is to be divided; a minimum number of assignments into which the job is to be divided; a recommended number of assignments into which the job is to be divided; and a required number of assignments into which the job is to be divided.

33. The machine implemented method of claim 25, further comprising:

receiving at the controller process a second computing job for processing by a second application that is separate from the controller process;

after receiving the second computing job, the controller process instructing a particular application instance, of a plurality of instances of the second application that execute in the distributed computing environment, to divide the second computing job;

receiving, at the controller process from the particular application instance, second assignment information describing how the second computing job is divided into a second plurality of assignments;

the controller process assigning, based on the second assignment information, the second plurality of assignments to at least a subset of the plurality of instances of the second application for processing, wherein each application instance in the subset of the plurality of instances of the second application is assigned one or more of the assignments in the second plurality of assignments;

the controller process determining that the subset of the plurality of instances of the second application has completed processing of the second plurality of assignments to produce a second plurality of assignment results; and the controller process instructing a certain application instance, of the plurality of instances of the second application, to perform post-processing on the second plurality of assignment results;

wherein the second application is different from the application.

34. The method of claim 25, wherein the controller process instructing the first application instance to divide the computing job comprises:
the controller process sending a document to the first application instance that the first application instance uses as a template to provide the assignment information to the controller process; and wherein the controller process providing the assignment information to the second application instance to enable the second application instance to perform post-processing on the assignment results based on the assignment information comprises:
the controller process providing the document to the second application instance.

* * * * *